United States Patent [19]

Eisemann

[11] 3,917,282

[45] Nov. 4, 1975

[54] SWITCH-OFF DEVICE FOR A RECORD CHANGER

[75] Inventor: Kurt Eisemann, Berlin, Germany

[73] Assignee: U.S. Philips Corporation, New York, N.Y.

[22] Filed: Mar. 19, 1974

[21] Appl. No.: 452,607

[30] Foreign Application Priority Data

Mar. 20, 1973 Germany ........................... 2313740

[52] U.S. Cl. ............. 274/1 R; 274/15 R; 274/23 B; 274/15 A

[51] Int. Cl.$^{2}$ .......................................... G11B 17/00

[58] Field of Search ....... 274/1 R, 15 R, 15 A, 23 B

[56] References Cited

UNITED STATES PATENTS

| | | | |
|---|---|---|---|
| 1,915,906 | 6/1933 | Thomas | 274/23 B |
| 2,596,016 | 5/1952 | Falk | 274/1 R |
| 3,854,730 | 12/1974 | Takizawa | 274/15 R |

*Primary Examiner*—Richard E. Aegerter
*Assistant Examiner*—Larry Jones
*Attorney, Agent, or Firm*—Frank R. Trifari; David R. Treacy

[57] ABSTRACT

Switch-off device for a record changer or automatic record player having a switch pin within the tone arm rest arranged to be depressed by the tone arm and a mechanism which pivots the tone arm between an inoperative position and operative positions. When the tone arm is lowered onto the arm rest the switch pin operates control members which release a switch control locked in the switch-on position only after the mechanism has been returned to the inoperative position by the driving motor.

7 Claims, 15 Drawing Figures

SWITCH-OFF DEVICE FOR A RECORD CHANGER

The invention relates to a switch-off device for a record changer or automatic record player (hereinafter referred to as record player) having a switch pin which is adapted to be depressed within the tone-arm rest by the tone arm and a control member for controlling the mechanism which causes the tone arm to pivot between an inoperative position and operative positions, a mechanical switch when displaced switching the driving motor of the changer or player.

In automatic record players, after a record has been played and the tone arm has been returned to its rest the idler wheel must be disengaged, the mechanism must be moved to the inoperative position and the motor must be switched off. It is known to switch off the motor by means of a switch pin which is depressed by the tone arm being lowered onto the arm rest. At the instant at which the pin is depressed, however, the mechanism generally has not yet returned to the inoperative position and mechanical energy-storing elements are used which cause the remaining movements of the mechanism to be performed.

In record players having comparatively large rotating masses the turntable may be used as a flywheel. The turntable then enables the switch mechanism to be returned to the inoperative position. When there are no such large rotating masses, the mechanism may be operated by a spring in which the required energy is stored during operation. In any case, however, when the motor is prematurely switched off the final movements have to be performed by a previously stored amount of energy.

It is an object of the present invention to provide a switch-off device in which all the movements of the record player are completed before the motor is switched off.

In a device according to the invention when the tone arm is lowered onto the arm rest the switch pin actuates control elements which release the switch from the locked switch-on position only after the mechanism has been returned to the inoperative position by the driving motor.

Thus in this case the driving motor returns all the components of the mechanism to their inoperative positions before being switched off itself.

In a preferred embodiment of the invention the control elements include a rocker, and a lever which is mounted on the mounting plate so as to be pivotable about a vertical axis and which after the motor has been switched on prevents the switch from returning to the switch-off position, the rocker being mounted on the lever so as to be pivotable about an axis which extends at right angles to the lever axis. The rocker is pivoted by the switch pin when the latter is depressed in the tone arm rest by the tone arm being lowered, so that an arm of the rocker is moved into the path of a projection on a control member. Movement of the control member then rotates the rocker together with the lever so that the lever swivels out of the position in which it locks the switch, permitting the switch to return to the switch-off position.

Thus, the switch is held in the switch-on position until after the lowering of the tone arm on the arm rest. The control member, for example a slide, has moved to an extent such that all the mechanical movements of the mechanism have terminated.

In another embodiment of the invention the rocker arm portion which co-operates with the control member is heavier than the rocker arm portion which cooperates with the switch pin. In this embodiment the rocker need not be biassed by an additional spring; moreover, owing to the distribution of the weight of the rocker the force required for its operation can be more readily controlled.

In a further embodiment of the invention the locking lever engages a cam on a switch operating member. This cam may be designed so that the rocker arm when struck and pivoted by the control slide is moved to a position beyond the end position of the control slide. Because in the meantime the switch pin has released the rocker, the latter can return to its initial position. For troublefree co-ordination of the movements of the rocker and the locking lever it is of advantage for their pivotal axes to intersect.

An embodiment of the invention will now be described, by way of example, with reference to the accompanying diagrammatic drawings, in which:

FIG. 1 shows the initial or inoperative position of the switch-off device,

FIG. 2 shows the condition after the record player has been switched on electrically, FIG. 3 shows the tone arm in the raised position and the switch operating member in the locked condition, FIG. 4 shows the tone arm placed on its rest and illustrates the preparations for switch-off, and FIG. 5 shows the switch-off of the record player by means of the switch mechanism.

Figure 1A:
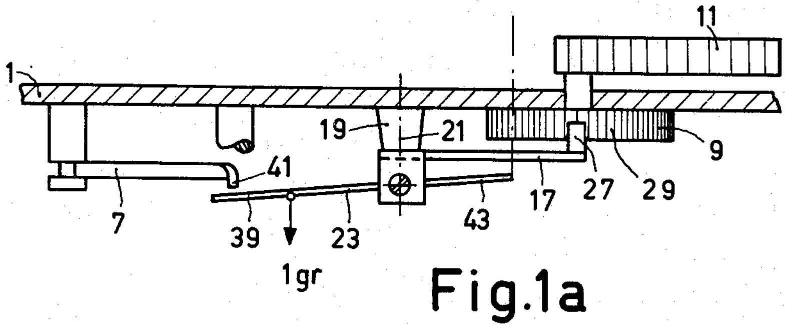
FIGS. 1 to 5 show successive stages in the operation of the switch-off device, the part *b* of each Figure being a plan view, the part *a* side elevation and the part *c* showing the tone-arm rest and the tone arm.

Referring now to the Figures, a tone arm 5 is mounted in gimbals 3 on a mounting plate 1. A slide member 7 is mounted on the mounting plate 1 so as to be capable of movement parallel thereto and the mounting plate further carries a switch operating member, or drum controller 9 which can be rotated by means of a handle 11 extending above the mounting plate 1. The tone arm 5 is supported by a rest 13 which accommodates a switch pin 15 which can move in a substantially vertical direction. The switching device according to the invention further includes a locking lever 17 which is adapted to pivot on a support 19 about a vertical axis 21. The locking lever 17 carries a rocker 23 arranged to pivot about an axis 25 which intersects the axis 21.

In the stage of operation shown in FIG. 1 a guide pin 27 provided at the free front end of the locking lever 17 engages a switch cam disk 29 of the drum 9. The pin 27 is urged into contact with the cam disk 29 by a tension spring 31. The radius of curvature $R_2$ of the operative face of the cam disk is smaller than the radius of curvature $R_1$ of the switch projection 33 which forms the cam, so that the raised part 37 of the cam disk 29 between the edges 35 protrudes from an arc of radius $R_1$ about the axis of the drum, which arc is shown by a dot dash line. Thus an arm 39 of the rocker 23 is clear of a projection 41 on the slide member 7 in the inoperative position of the slide member 7 and the rocker 23.

The weight of the arm 39 of the rocker exceeds that of the other arm 43 by about 1 gram. As a result, in the inoperative position the arm 39 remains below the projection 41. Hence the slide member 7 can move irrespective of the position of the rocker 23.

Figures 1B, 1C:
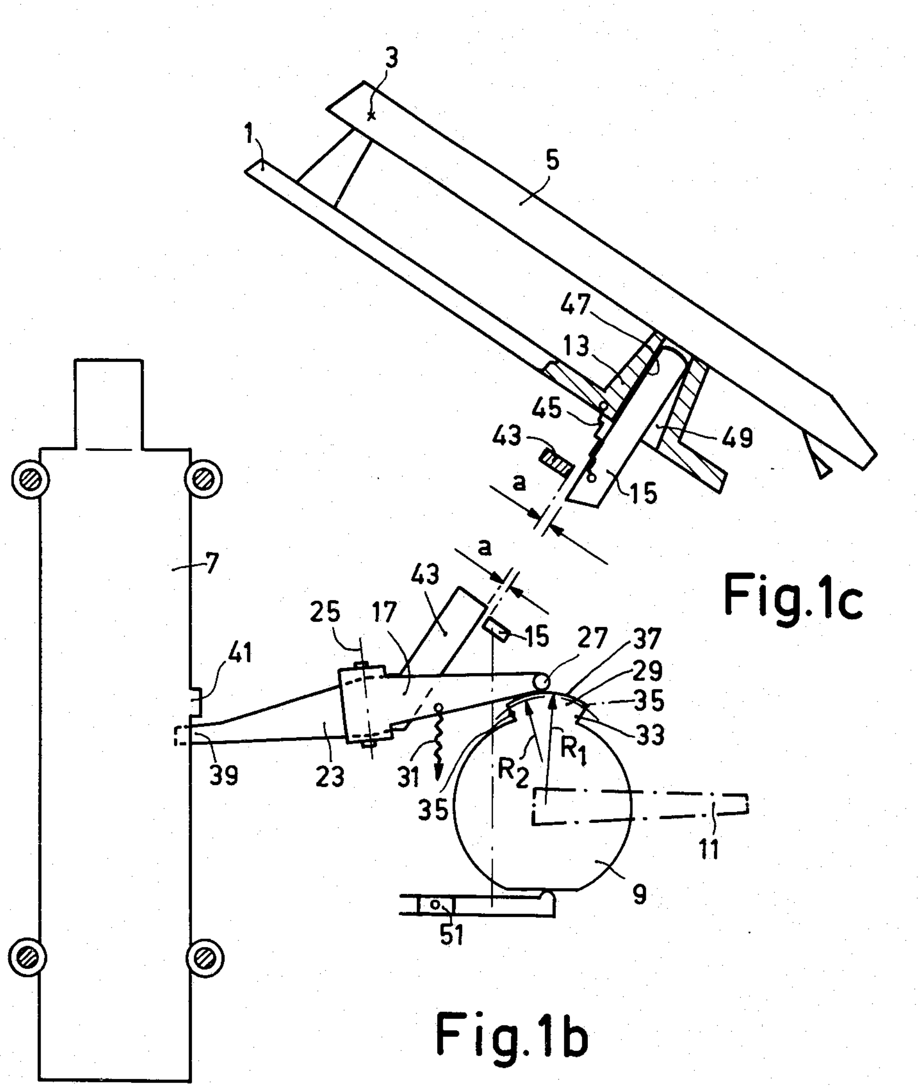

The switch pin 15 is spaced from the free end of the rocker arm 43 by a distance *a*. FIG. 1*b* shows an axial plan view of the pin 15, and in FIG. 1*c* the free end of the arm 43 is shaded. The pin 15 is drawn upward in an oblique direction so as to engage a left-hand edge 47 of a cavity 49 in the tone-arm rest 13.

Figure 2A:
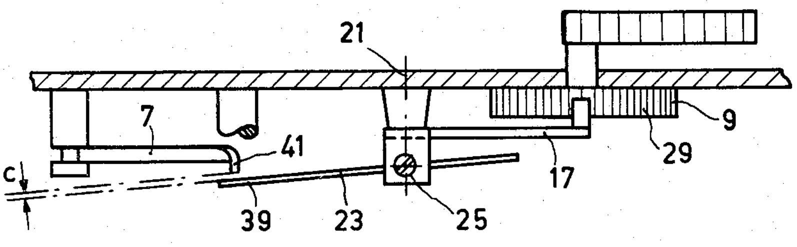
Figures 2B, 2C:
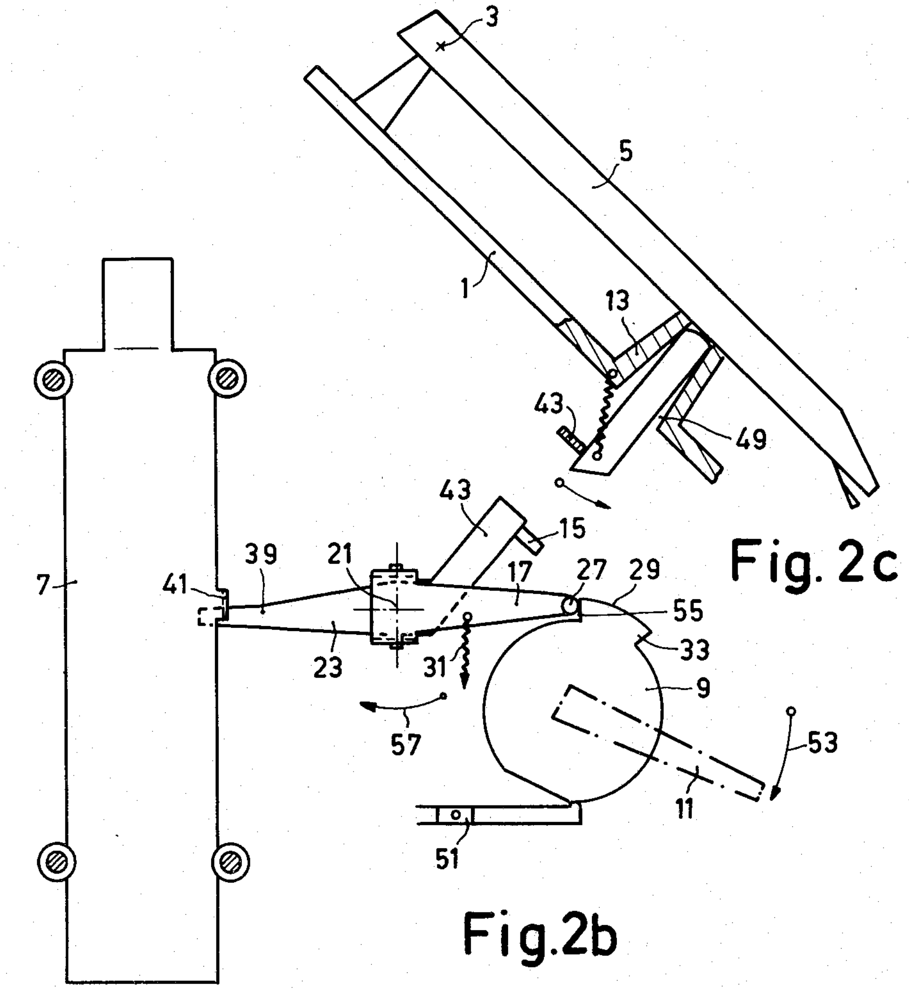

An electric on-off switch 51 is open in the position of the drum controller shown in FIG. 1*b*. When the drum 9 is rotated in the direction indicated by an arrow 53 by means of the handle 11 (FIG. 2*b*), the guide pin 27 snaps into a latching depression 55 in the drum 29. The lever 17 is pivoted about the axis 21 in the direction indicated by an arrow 57. The rocker 23 follows this pivotal movement. Consequently the rocker arm 43 also performs a clockwise movement, strikes the switch pin 15 and urges it to the right within the cavity 49, as is shown in FIG. 2*c*. As a result, the free end of the rocker arm 39 extends under the projection 41 and is spaced therefrom by a distance *c* (FIG. 2*a*). The switch 51 is closed so that the record player is rendered operative.

Figure 3A:
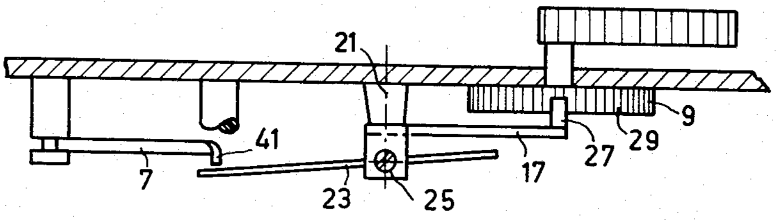
Figures 3B, 3C:
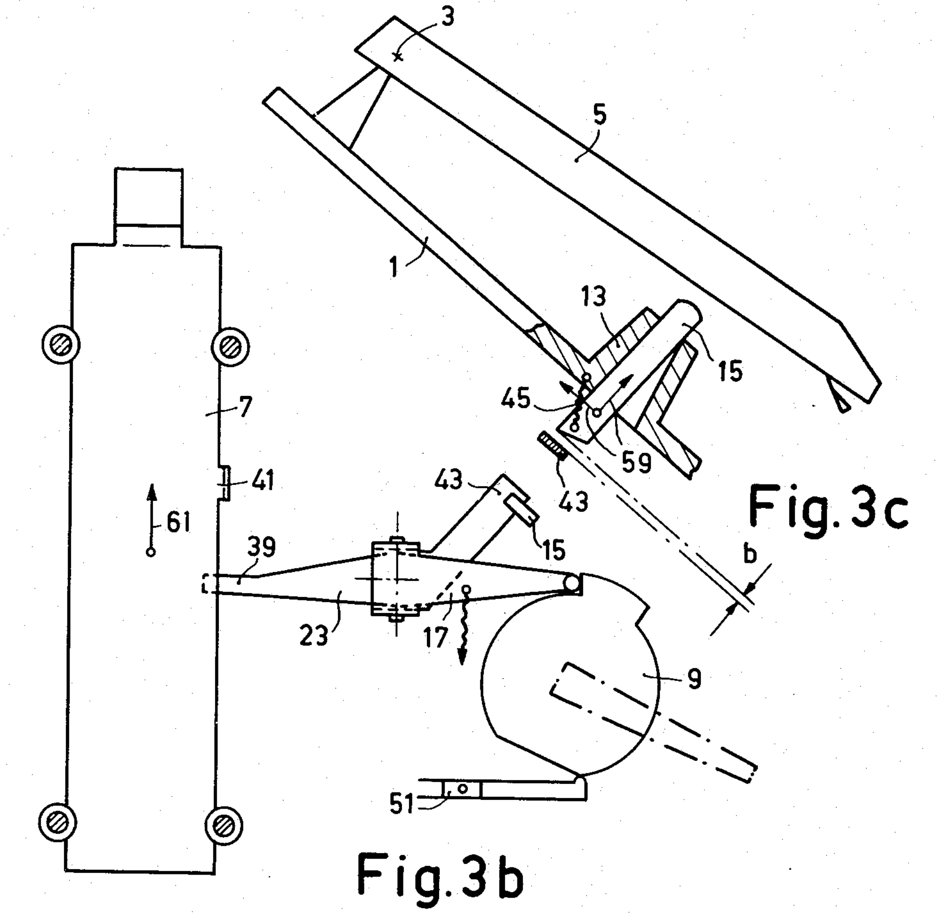

Shortly after the starting of the record player the tone arm 5 is lifted from its rest 13 by the mechanism. Thereupon the spring 45 draws the pin 15 upward. Because the force of the spring 45 owing to its oblique mounting comprises two components 59, the pin after its disengagement from the arm 43 moves into a position over the arm 43 from which it then is spaced by a distance *b* (FIG. 3*c*). The drum 9 remains in the locked position; the positions of the locking lever and of the rocker 23 remain unchanged. As FIG. 3*b* shows, the slide member 7 is displaced in the direction indicated by an arrow 61. As a result the projection 41 moves away from the rocker arm 39.

Figure 4A:
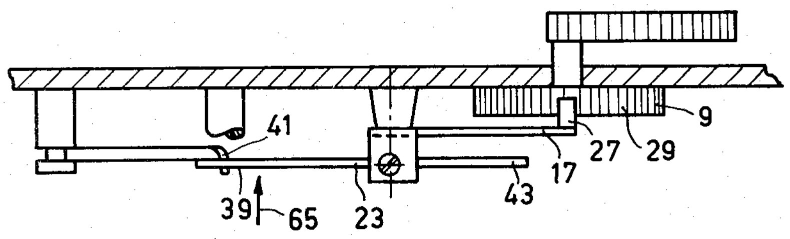
Figures 4B, 4C:
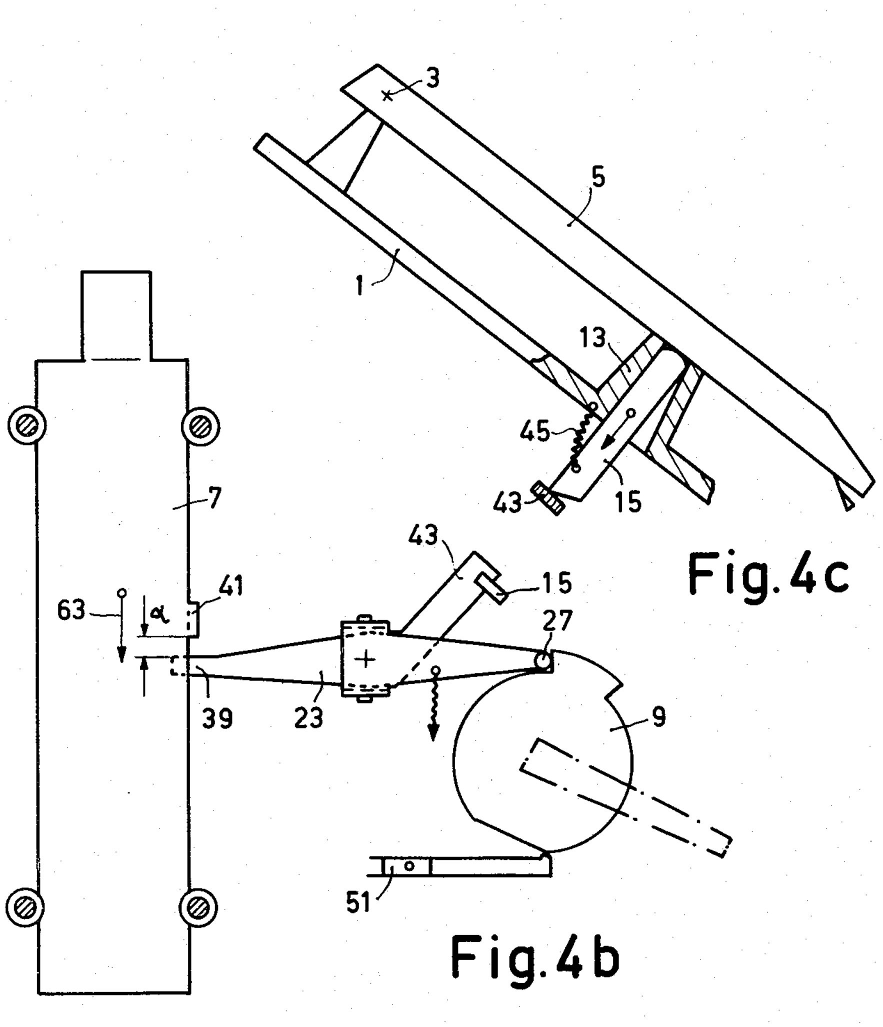

When the record player has finished the playing of a record, the slide member 7 is displaced in the direction indicated by an arrow 63 and returns the tone arm 5 to its rest 13. At this instant the projection 41 is still spaced from the rotor arm 39 by a distance *d*. The tone arm in its descent onto the rest 13 pushes the pin 15 downward. The pin 15 strikes the free end of the rocker arm 43, reversing the position of the rocker 23. As a result the rocker arm 39 moves upward in the direction indicated by an arrow 65 into engagement with the lower surface of the slide member 7. At this instant the guide pin 27 still locks the drum 9 so that the switch 51 remains closed (FIG. 4*b*).

Figure 5A:
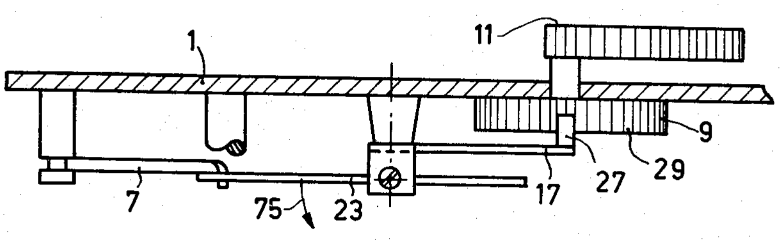
Figures 5B, 5C:
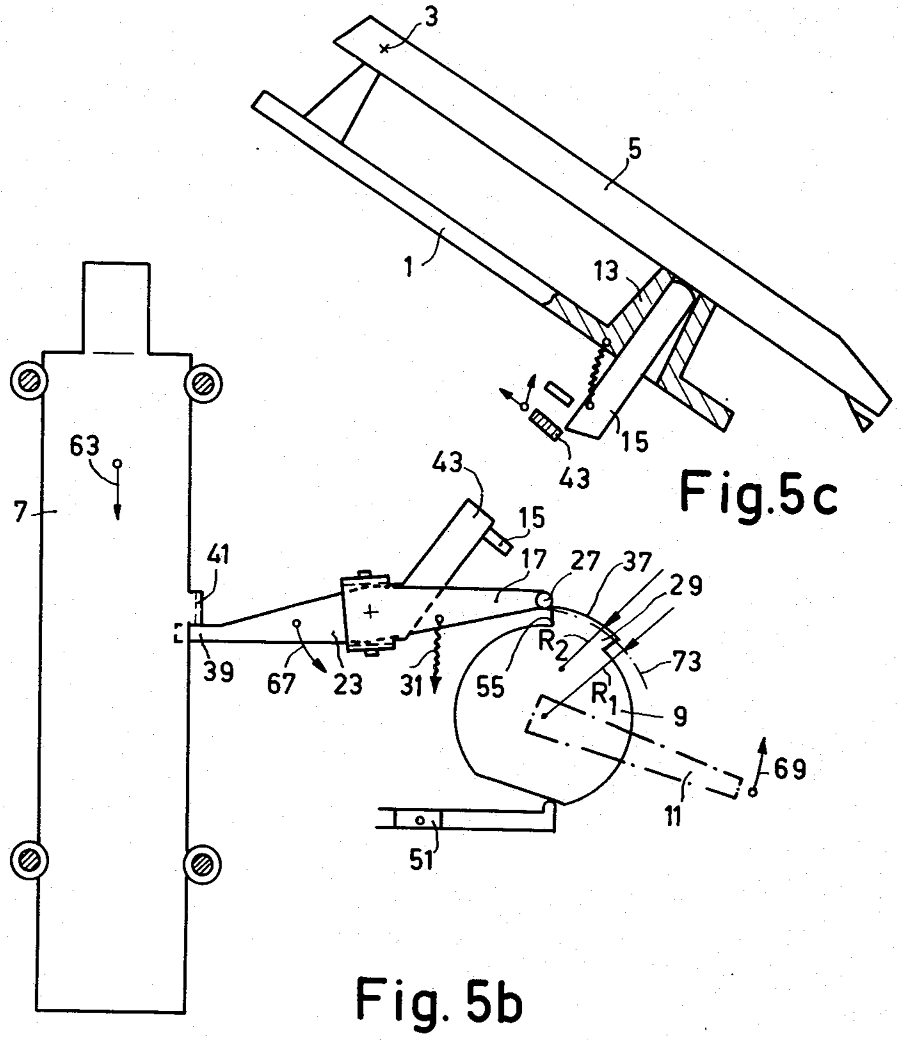

On further movement of the slide member 7 in the direction indicated by the arrow 63 the projection 41 strikes the rocker arm 39. As a result the slide member 7 moves the rocker 23 in the direction indicated by an arrow 67. Consequently the rocker 23 pivots the locking lever 17 against the action of the spring 31. Hence the pin 27 is moved out of the depression 55 by counterclockwise rotation. This enables the drum 9 also to rotate counterclockwise in the direction indicated by an arrow 69. The guide pin 27 then engages the projection 37 of the disk cam 29, which projection owing to the smaller radius $R_2$ is higher than the theoretical surface indicated by a dot dash arc line 73 of radius $R_1$ about the axis of the drum 9. Consequently the rocker arm 39 is moved clear of the projection 41, enabling the rocker to reverse its position again. However, previously the pivotal movement of the rocker 23 has caused the arm 43 to be disengaged from the switch pin 15, so that the free end of the arm 43 has moved to a position lateral with respect to, and in front of, the pin 15, as is shown in FIGS. 5*c* and 1*c*. The return of the rocker 23 to the initial position is indicated in FIG. 5*a* by an arrow 75.

The drum 9 returns to the position shown in FIG. 1*b* by counterclockwise rotation in the direction indicated by the arrow 69. As a result the switch 51 can be opened and the record changer or player is switched off.

We claim:

1. A switching device for a record player having a tone arm movable to a rest position, first means for sensing movement of said arm to said rest position, said means moving to a rest position in response to said arm movement, and an electric switch having on and off positions, comprising a mechanism having inoperative and operative states for conditioning at least one part of the record player, and a control means actuated by movement of said first means to said rest position for releasing said switch from said on position only after said mechanism has been returned to the inoperative state, wherein said control means comprises:

means for mounting an element for movement between at least first and second positions;

second means operable while said element is in said first position for sensing movement of said first means to the rest position, said second means having a first state in the absence of sensing said movement of said first means and a second state when movement of said first means to said rest position has been sensed;

means operable only while said second means is in the second state to move said element from the first position to the second position in response to change of said mechanism from the operative to the inoperative state; and means for moving said switch to the off position in response to movement of said element to the second position.

2. A device as claimed in claim 1 wherein said second means is operable only while said element is in said first position.

3. A switching device as claimed in claim 2, comprising in addition means for inhibiting response of said second means to said first means being in a rest position upon movement of said element from the second to the first position, thereby preventing interference by said means for moving said element with an initial movement of said element during a turnon procedure.

4. A switching device as claimed in claim 1 wherein said player comprises a mounting plate, said means for moving said element comprises a projection portion of said mechanism which moves along a path as said mechanism changes from said operative to said inoperative states, said element comprises a lever pivotally mounted on the mounting plate for rotation about a vertical axis between said first and second positions, and said second means comprises a rocker pivotally mounted on said lever for motion about a horizontal axis between first and second rocker positions, said rocker having first and second arm portions, said first portion so disposed when said lever is in the first lever position as to be engageable by said first means for pivotal motion about said horizontal axis to said second rocker position in response to movement of said first means to said rest position, said second portion being moved into the path of said projection by rotation to the second rocker position, such that movement of said mechanism to said inoperative state causes said projection to engage said second portion and thereby rotate said lever from said first position to said second position.

5. A device as claimed in claim 4 wherein said rocker is so arranged that unbalanced weight of the rocker biases the rocker toward the first rocker position.

6. A device as claimed in claim 4 wherein said means for moving said switch comprises a member rotatable between at least an off and an on position and having a cam surface engaged by said lever, said cam surface having a latching portion, said lever engaging said latching portion when said drum and lever are in said on and said first lever positions respectively, and means responsive to the position of said rotatable member for actuating said switch.

7. A switching device as claimed in claim 4 wherein said horizontal axis intersects said vertical axis.

* * * * *